United States Patent Office 2,723,987
Patented Nov. 15, 1955

2,723,987

CARBOXY ORGANOSILICON COMPOUNDS

John L. Speier, Pittsburgh, Pa., assignor to Dow Corning Corporation, Midland, Mich., a corporation of Michigan No Drawing. Application October 18, 1954,
Serial No. 463,062

8 Claims. (Cl. 260—448.2)

This invention relates to organosilicon compounds having carboxylated radicals substituted on the silicon.

This invention is a continuation-in-part of applicant's copending application Serial No. 398,897, filed December 17, 1953, now abandoned.

The term "organo functional group" as employed herein refers to organic groups which are attached to a silicon atom by Si—C bonds, which group also has an organic functional group substituted therein: (i. e., COOH, —COOR, —OH, —NH₂, etc.). The term "organo functional silicon compound" refers to silicon compounds containing an "organo functional group." The term "silicon functional group" as employed herein refers to a hydrolyzable or condensable group attached to silicon by a linkage other than Si—C (i. e., hydroxyl, halogen, hydrogen, alkoxy, amino, etc.).

Organo functional silicon compounds have been known for some time. However, in the past these compounds have been generally limited to those which have four nonhydrolyzable groups attached to the silicon. Such compounds are not capable of being converted to siloxanes without removal of one of the nonhydrolyzable groups. Under certain conditions, namely, where one of the groups is methyl or phenyl, these silanes can be converted to siloxanes by cleaving one of the methyl or one of the phenyl groups with sulphuric acid and thereafter hydrolyzing the resulting silyl sulphate to a siloxane. However, this method suffers from the disadvantage that it inherently gives a disiloxane which is not capable of further siloxane polymerization. This severely limits the applicability of such materials. The present invention provides materials which obviate this difficulty.

Since the advent of organopolysiloxanes there has been continued effort to find satisfactory combinations of organosiloxane resins and alkyd resins. This problem has been approached from the standpoint of both modifying a siloxane resin with an alkyd resin and of modifying an alkyd resin with an organosiloxane. Efforts in the past have been directed either to merely blending the two types of resins or to reacting the two by means of a silicon functional group. This type of reaction produces a C—O—Si linkage which as is well known is inherently hydrolytically unstable. Consequently, even though previously known silicone-alkyd resins have met with considerable commercial success, they still suffer from the disadvantage of relatively poor moisture resistance and alkali resistance.

One of the primary objects of this invention is to provide organosiloxanes which can be combined chemically with various types of organic resins without having Si—O—C linkages present in the resin. Another object is to provide functional organosiloxanes which have greater flexibility of application than has previously been possible. Another object is to provide functional organopolysiloxanes which are commercially feasible. Other objects and advantages will be apparent from the following description.

This invention relates to organosiloxanes of the formula

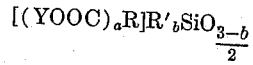

in which Y is an alkyl radical or a hydrogen atom, R is a divalent or trivalent saturated aliphatic or cycloaliphatic hydrocarbon radical wherein each carbonyl group is attached to at least the third carbon atom away from the silicon atom, R' is a monovalent hydrocarbon or a halogenated monovalent hydrocarbon radical free of aliphatic unsaturation, $a$ is an integer from 1 to 2 inclusive, and $b$ has a value from 0 to 1 inclusive.

The compositions of this invention are prepared by hydrolyzing organosilanes of the formula

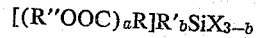

in which R'' is any alkyl radical, X is chlorine, bromine, or hydrogen, and R, R', $a$, and $b$ are as above defined. When it is desired to obtain siloxanes having ester groups (that is, those in which Y is an alkyl radical), the hydrolysis of the X group is carried out at a temperature preferably below 35° C. Under these mild conditions the organic ester group is not hydrolyzed. In general it is best to carry out the hydrolysis in an inert solvent such as toluene or benzene. The resulting siloxane can then be further condensed if desired by heating in the presence of small amounts of condensation catalyst.

When one desires to obtain carboxylic acid substituted siloxanes (that is, those in which Y is hydrogen) the above silanes should be hydrolyzed under conditions which will not only remove the X group from the silicon but also the alkyl group of the carboxy ester radical. In other words, the hydrolysis conditions should be those used to hydrolyze organic esters. In general, for the purpose of this invention, this may be accomplished by refluxing the silane with an aqueous alcoholic alkaline solution.

The silanes which are hydrolyzed to give the products of this invention are prepared generally by reacting unsaturated esters with a hydrogen-containing silane of the type R'$_b$SiX$_{3-b}$, where R', $b$ and X are as above defined. In such silanes at least one of the X radicals is hydrogen. This reaction is generally carried out by heating a mixture of the unsaturated compound and the silane at a temperature below 200° C. If desired, the reaction may be carried out in the presence of a peroxide catalyst such as tertiarybutylperbenzoate. The reaction involved may be represented schematically as follows:

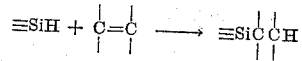

This reaction cannot be carried out satisfactorily on compounds containing carboxyl groups because the active hydrogen of the carboxyl reacts with the X radicals of the silane to give complicated unusable materials. However, the reaction proceeds smoothly when the carboxyl group is esterified. As shown above, a carboxyl group can be subsequently regenerated by hydrolyzing the ester. The preferred silane reactants are those in which all of the X groups are hydrogen or those which contain both hydrogen and bromine atoms substituted on the silicon. Thus, for example, the preferred reactants are silanes such as monophenylsilane, tribromosilane, or methyldibromosilane. The use of silanes and bromosilanes is preferred because of the higher yields obtained over that obtained with chlorosilanes.

The unsaturated esters which are reacted with the silanes can be either monoesters or diesters. In order for satisfactory reaction to occur, the unsaturated linkage must be so positioned that each carbonyl group is at least three carbon atoms removed from the silicon (i. e., on at least the gamma carbon) after reaction has taken place. Thus, esters of acrylic acid are not suitable for reaction in this invention, but esters of vinylacetic acid are suitable. Furthermore, siloxanes saving organo functional groups on carbon atoms α and β to the silicon are hydrolytically unstable and therefore not suitable for the purpose of this invention.

The unsaturated esters can be either aliphatic or cycloaliphatic esters. Furthermore, the cyclic esters can be either monocyclic or polycyclic. Specific examples of esters which are operative are, for example, the methyl ester of vinylacetic acid, methyloleate,

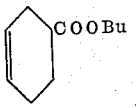

$$EtOOC(CH_2)_nCH=CH(CH_2)_nCOOEt$$

where each $n$ is an integer of at least 2,

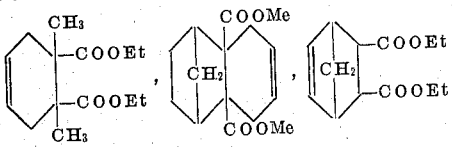

and $CH_2=CH(CH_2)_3COOC_{18}H_{37}$.

The cyclic unsaturated esters which are operative in this invention are best prepared by the well-known Diels-Alder reaction which involves the addition of an unsaturated ester to a 1,4-conjugated diene system.

From the above it can be seen that the R group in the compounds of this invention can be any divalent saturated aliphatic hydrocarbon radical of at least 3 carbon atoms such as propylene, butylene, octadecylene, or any trivalent saturated hydrocarbon radical of at least 3 carbon atoms such as

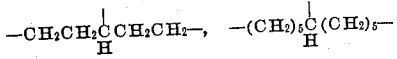

and

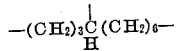

or any cyclic divalent aliphatic hydrocarbon radical of at least 5 carbon atoms such as cyclohexylene, cyclopentylene, methylcyclohexylene, and

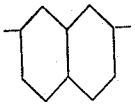

and any trivalent cycloaliphatic saturated hydrocarbon radical of at least 6 carbon atoms such as

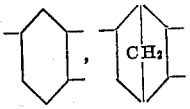

and

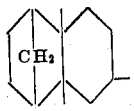

The siloxanes of this invention may contain one R' group substituted on the silicon. The R' group can be any monovalent hydrocarbon radical which is free of aliphatic unsaturation such as, for example, alkyl radicals such as methyl, ethyl, or octadecyl, cycloalkyl radicals such as cyclohexyl or cyclopentyl; and aryl hydrocarbon radicals such as phenyl, tolyl, benzyl, naphthyl, or xenyl. In addition R' can be any halogenated monovalent hydrocarbon radical which is free of aliphatic unsaturation such as, for example, chlorophenyl, tribromoxenyl, α,α,α-trifluorotolyl, tetrafluoroethyl, and chlorocyclohexyl.

The siloxanes of this invention can be copolymerized with other siloxanes of the type

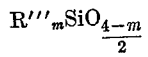

where $m$ has an average value from 1 to 3 inclusive and $R'''$ is any monovalent hydrocarbon or halogenated monovalent hydrocarbon. This copolymerization can be accomplished in the usual manner for copolymerizing siloxanes such as, for example, by cohydrolysis of the corresponding hydrolyzable silanes or by catalytic copolymerization of the corresponding siloxanes in the presence of a siloxane bond rearranging catalyst. It is to be understood that the siloxanes of this invention can be copolymerized with other organo functional siloxanes such as those disclosed and claimed in the applicant's copending application Serial No. 398,898, filed December 17, 1953, and his application entitled "Organosiloxane Alcohols," Serial No. 463,061, filed concurrently herewith. In the copolymers the number of organo functional groups can be varied at will. Thus, for example, the mol per cent of organo functional siloxane in the copolymer can be varied from .001 to 99.999 per cent. Since the value of $m$ can be varied from 1 to 3, the copolymers may be in the form of fluids, elastomers, or thermosetting resins.

In addition the siloxanes of this invention either alone or when copolymerized with other siloxanes can be reacted with poly functional organic compounds such as polyhydric alcohols and polyamines to give resinous materials. One of the primary advantages of the siloxanes of this invention is that the over-all proportion of organosiloxane in the organosilicon-organic resin can be varied at will, for example, from 1 to 99% by weight or more. The siloxanes of this invention can also be reacted via the organo functional group with other organo functional siloxanes such as those disclosed in applicant's aforesaid copending applications.

The compounds of this invention are particularly useful in the preparation of siloxane-modified alkyd resins. For example, the siloxanes of this invention can be substituted for some or all of the dibasic acid in an alkyd resin. Thus, for example, the siloxanes of this invention can be reacted with glycerine to give thermosetting alkyd-type resins which are exemplified by extremely good moisture resistance, alkali resistance, and by an improved thermal stability over straight organic alkyd resins. It is to be understood that such alkyd resins can be modified by drying oils or drying oil acids in the usual manner. Thus, it is possible to produce air-drying paints and varnishes from the compounds of this invention.

The siloxanes of this invention are useful, per se, as lubricants.

The following examples are illustrative only and are not to be construed as limiting the invention which is properly delineated in the appended claims.

*Example 1*

A mixture of 44.5 g. of methyl oleate and 2.8 g. of t-butyl perbenzoate was added slowly to 32 g. of monophenylsilane. The reaction mixture was heated during and after the addition for 18 hours at 90° C. Upon distillation a 100 per cent yield of $C_6H_5SiH_2C_{17}H_{34}COOMe$ was obtained.

When this material is treated with dilute sodium hydroxide solution at room temperature siloxane

is obtained.

When the above silane is refluxed with dilute water and ethanol sodium hydroxide solution for 15 hours and the resulting material is acidified, the siloxane

is obtained.

*Example 2*

A mixture of 30 g. of methyl undecenylate and 2.8 g.

of t-butylperbenzoate were added slowly to 32 g. of monophenylsilane. The reaction mixture was heated during and after the addition at 90° C. for 12 hours. A 98 per cent yield of methyl-11-(phenylsilyl)-undecanoate, $$C_6H_5SiH_2C_{10}H_{20}COOMe$$

was obtained.

When this silane was refluxed with dilute sodium hydroxide solution and the reaction mixture acidified the siloxane $[C_6H_5(HOOCH_{20}C_{10}SiO]_x$ is obtained.

*Example 3*

A mixture of 130 g. of methyl 4-cyclohexane carboxylate

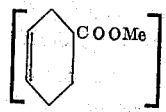

200 g. of monophenylsilane and 2 g. of t-butylperbenzoate was heated at about 106° C. to give a 66 per cent yield of mixed isomers of the formula $$C_6H_5SiH_2(C_6H_{10}COOMe)$$

B. P. 157–159° C. at 4.5 mm. 40 g. of this silane ester was added with stirring to a solution of 7 g. of water in 50 ml. of ether and 25 ml. of ethanol. The solution contained a catalytic amount of sodium hydroxide. Gas evolution was rapid and the temperature was maintained at or below 30° C. The mixture stood at room temperature for 15 hours and was then neutralized with dilute hydrochloric acid. The organic layer was removed, washed with water, and dried over sodium sulphate. After removal of the solvent a quantitative yield of a viscous polymer having the formula

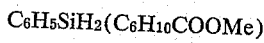

was obtained. This polymer had a refractive index of 1.5384 and a density at 25° C. of 1.131.

*Example 4*

40 g. of the silane $C_6H_5SiH_2(C_6H_{10}COOMe)$ was added over a period of one hour to a solution of 7 g. of water in 50 ml. of ether and 25 ml. of ethanol. The solution contained a catalytic quantity of sodium hydroxide. When the addition of the silane was complete a solution of 7.5 g. of sodium hydroxide in 25 ml. of water was added slowly. The mixture was stirred and heated at 85° C. for 3 hours. 75 ml. of benzene were added and the mixture was acidified. The organic layer was washed twice with water and neutralized with dilute sodium hydroxide. The solution was dried and upon evaporation of the solvent at reduced pressure the siloxane

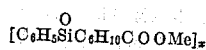

was obtained as an amorphous white solid, melting at 85 to 90° C. This siloxane was soluble in acetone, ether, and alcohol.

*Example 5*

47.5 g. of methyl 4-cyclohexenecarboxylate, 45.5 g. of trichlorosilane and 1 g. of 10 per cent platinum on asbestos were heated in a stainless steel vessel at 140° to 170° C. for 4 days. Upon distillation of the residue an 18% yield of $Cl_3SiC_6H_{10}COOMe$, boiling point 93–94° C. at .5 mm. was obtained.

When this silane ester is dissolved in ether and hydrolyzed with water, the resinuous siloxane having the unit structure $MeOOCH_{10}C_6SiO_{1.5}$ is obtained.

*Example 6*

6 g. of a viscous siloxane having the formula

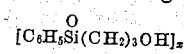

prepared in accordance with applicant's copending application filed concurrently herewith, 8.3 g. of a viscous siloxane having the formula

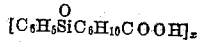

and 10 g. of 12-hydroxystearic acid were mixed and heated at 250° C. in an atmosphere of carbon dioxide 16 hours. During the heating water evolved and the resulting product was a tough, elastic material which adhered strongly to glass.

10 g. of this polymer were mixed with 35 g. of a fume silica and with 2 g. toluene diisocyanate. After 24 hours the mixture set to a tough, rubbery material which had a modulus of 320 at 50% elongation.

*Example 7*

13.3 g. of the siloxane

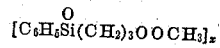

and 5 g. of the siloxane

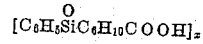

were mixed with 2 drops of t-butylamine and 3 drops of piperidine and heated at 250° C. in a nitrogen atmosphere at approximately 100 mm. pressure for 6 hours. Acetic acid was evolved and a viscous tacky resin was obtained.

The resulting product was further reacted with 1 g. of maleic acid at 250° C. for 3 hours in a nitrogen atmosphere. The viscosity of the material increased and the resulting product was a resinous material which was completely soluble in acrylonitrile.

*Example 8*

When one mol of dimethyl-3,6-endo-ethylene-1,2,3,6-tetrahydrophthalate

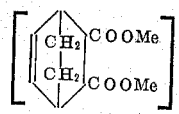

is mixed with 2 g. of t-butylperbenzoate and added slowly to 15 mols of methyldibromosilane at a temperature of 80° C. and the mixture is maintained at that temperature for 15 hours the silane

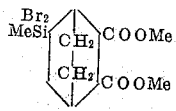

is obtained.

When this silane is added to a mixture of water and ether and the temperature maintained below 35° C. the siloxane

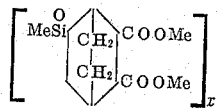

is obtained.

When this siloxane is refluxed with a 50% by volume aqueous ethanol solution containing a catalytic amount of NaOH for 5 hours and the product thereafter acidified, the siloxane acid

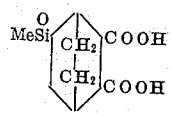

is obtained.

*Example 9*

Chlorophenylsilane $ClC_6H_4SiH_3$ is obtained by reducing chlorophenyltrichlorosilane with lithium aluminum hydride. When one mol of $ClC_6H_4SiH_3$ is reacted with one mol of methylundecenylate in the manner of Example 8, the silane (ClC6H4)H2Si(CH2)10COOMe is obtained.

When the silane is treated with cold dilute NaOH solution the siloxane

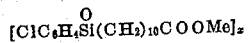

is obtained.

When this siloxane is refluxed with a 50% by volume aqueous ethanol containing a catalytic amount of NaOH and the product is acidified the siloxane acid

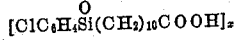

is obtained.

Example 10

When an equimolar mixture of Cl3SiC6H10COOMe, phenylmethyldichlorosilane and dimethyldichlorosilane is added to a mixture of water and toluene a resinous copolymeric siloxane composed of the units C6H5(Me)SiO, Me2SiO, and O1.5SiC6H10COOMe is obtained. When this copolymer is heated to 85° C. with dilute aqueous alcoholic alkali solution and the reaction mixture is thereafter acidified, a copolymeric siloxane having the unit formulae C6H5(Me)SiO, Me2SiO, and O1.5SiC6H10COOH is obtained.

Copolymers are also obtained when the silane

Cl3SiC6H10COOMe is cohydrolyzed in like manner with phenylvinyldichlorosilane, trimethylchlorosilane, and tribromoxenyltrichlorosilane and the resulting copolymers are heated with a dilute aqueous alcoholic alkali solution and thereafter acidified.

Example 11

When MeSiHBr2 is reacted with methyl-4-cyclohexene carboxylate in the manner of Example 3 and the resulting product is hydrolyzed the siloxane

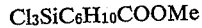

is obtained. When this siloxane is hydrolyzed in accordance with Example 4 the siloxane

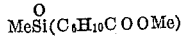

is obtained.

Example 12

172 g. of methyldichlorosilane and 56 g. of methyl bicyclo(2,2,1)heptene carboxylate were heated to reflux under nitrogen as 5 g. of t-butylperbenzoate and 20 g. of the ester were added. The mixture was heated overnight and distilled to give the chlorosilane methyl methyldichlorosilylbicyclo(2,2,1)heptylcarboxylate

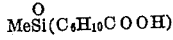

having the following properties: B. P. 105° C. at 2 mm., $n_D^{25}$ 1.4862, $d_4^{25}$ 1.201, sp. ref. found .2392, calculated .2399.

This chlorosilane was hydrolyzed in benzene solution and the solvent was removed and the resulting product washed free of acid and dried at 100° C. overnight. The resulting product was an extremely viscous polysiloxane of the unit formula

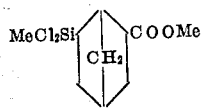

The above siloxane ester was heated in an ethylene glycol KOH solution at 85° C. for 20 hours and the resulting product was poured into dilute HCl. A fluffy white powder formed which was dried and found to have a neutral equivalent 304. This was the siloxane acid

When this acid was dehydrated it formed a hard brittle solid melting near 150° C. which upon analysis was found to be the siloxane

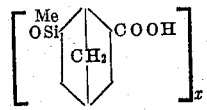

having a neutral equivalent of 206, percent silicon 14.1.

Example 13

1033 g. of trichlorosilane, 915 g. of the compound

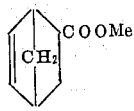

and 25 g. of t-butylperbenzoate were reacted as in Example 12. Distillation of the resulting product gave the chlorosilane

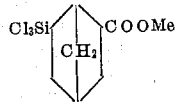

B. P. 122° C. at 2 mm., $d_4^{25}$ 1.311, $n_D^{25}$ 1.4937, sp. ref. .2220.

28.8 g. of this chlorosilane were mixed with a 25% solution of 40 g. NaOH in water. A clear solution formed on heating the mixture at 100–110° C. for 1½ hours. 50 ml. of toluene were added and the mixture stirred at 50° C. for 15 minutes. The mixture was cooled and the water layer was separated and acidified. A fluffy precipitate formed which was air dried for 15 hours, washed free of HCl, again air dried for 15 hours and finally heated 4 hours at 110° C. The resulting product was the siloxane acid of the formula

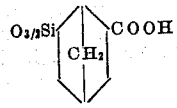

having a neutral equivalent of 200.

Example 14

155 g. of trichlorosilane, 90 g. of diethylbicyclo-(2,2,1)hep-5-ene-2,3-dicarboxylate and 4 g. of t-butylperbenzoate were reacted as shown in Example 12. The resulting product was distilled to give the chlorosilane

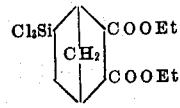

B. P. 172° C. at 3 mm., $n_D^{25}$ 1.4830, $d_4^{25}$ 1.274, sp. ref. .2243.

This chlorosilane was hydrolyzed in benzene with water and the hydrolysis mixture was evaporated to dryness to leave a resinous residue. The residue was washed with water and dried at 100° C. in an oven to produce a light yellowish powder. This material was found by analysis to be the siloxane

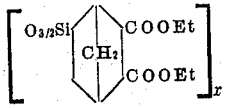

per cent silicon found 9.59, 9.69.

When this siloxane ester is hydrolyzed in accordance with the procedure of Example 12, the siloxane acid having the formula

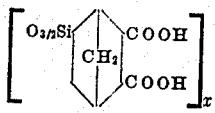

is obtained.

That which is claimed is:

1. A siloxane having the unit formula

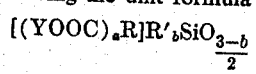

wherein Y is selected from the group consisting of alkyl radicals and hydrogen atoms, $a$ is an integer from 1 to 2 inclusive, R is selected from the group consisting of divalent and trivalent saturated aliphatic hydrocarbon radicals and saturated alicyclic divalent and trivalent hydrocarbon radicals, in which each carbonyl group is attached to at least the third carbon atom from the silicon, R' is selected from the group consisting of monovalent hydrocarbon radicals and halogenated monovalent hydrocarbon radicals, said radicals being free of aliphatic unsaturation, and $b$ has a value from 0 to 1 inclusive.

2. A siloxane of the unit formula

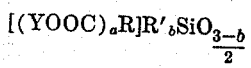

where Y is an alkyl radical, $a$ is an integer from 1 to 2 inclusive, R is selected from the group consisting of saturated aliphatic divalent and trivalent hydrocarbon radicals and saturated alicyclic divalent and trivalent hydrocarbon radicals, in which each carbonyl group is attached to at least the third carbon atom from the silicon, R' is selected from the group consisting of monovalent hydrocarbon and halogenated monovalent hydrocarbon radicals, free of aliphatic unsaturation, and $b$ has a value from 0 to 1 inclusive.

3. A siloxane having the unit formula

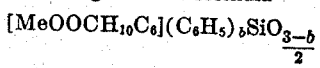

where $b$ has a value from 0 to 1 inclusive.

4. A siloxane having the unit formula $$[MeOOCH_{10}C_6]MeSiO$$

5. A siloxane of the unit formula

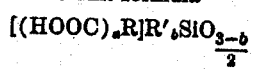

where R is selected from the group consisting of saturated aliphatic divalent and trivalent hydrocarbon radicals and saturated alicyclic divalent and trivalent hydrocarbon radicals, in which each carbonyl group is attached to at least the third carbon atom from the silicon, R' is selected from the group consisting of monovalent hydrocarbon and halogenated monovalent hydrocarbon radicals, free of aliphatic unsaturation, $a$ is an integer from 1 to 2 inclusive, and $b$ has a value from 0 to 1 inclusive.

6. A siloxane having the unit formula

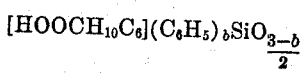

where $b$ has a value from 0 to 1 inclusive.

7. A siloxane having the unit formula $$[HOOCH_{10}C_6]MeSiO$$

8. A copolymeric siloxane composed of units of the formula

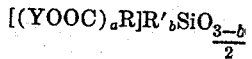

wherein Y is selected from the group consisting of alkyl radicals and hydrogen atoms, $a$ is an integer from 1 to 2 inclusive, R is selected from the group consisting of divalent and trivalent saturated aliphatic hydrocarbon radicals and saturated alicyclic divalent and trivalent hydrocarbon radicals, in which each carbonyl group is attached to at least the third carbon atom from the silicon, R' is selected from the group consisting of monovalent hydrocarbon radicals and halogenated monovalent hydrocarbon radicals, said radicals being free of aliphatic unsaturation, and $b$ has a value from 0 to 1 inclusive, and units of the formula

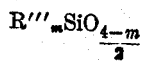

where R''' is selected from the group consisting of monovalent hydrocarbon radicals and halogenated monovalent hydrocarbon radicals, and $m$ has an average value of from 1 to 3 inclusive.

No references cited.